Figure 5:
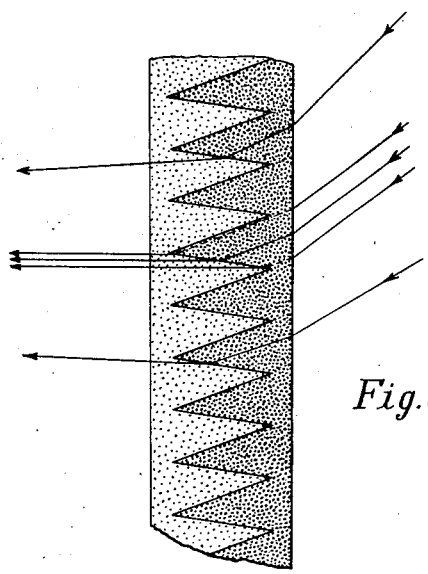

No. 865,136. PATENTED SEPT. 3, 1907.
F. L. O. WADSWORTH.
METHOD OF MAKING PRISM GLASS.
APPLICATION FILED DEC. 12, 1905.
2 SHEETS—SHEET 1.
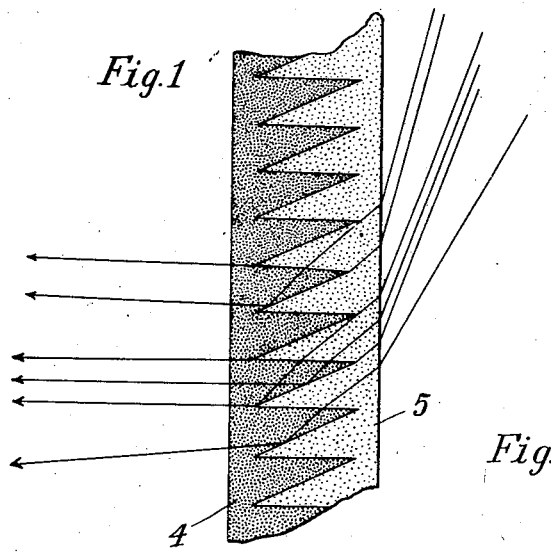
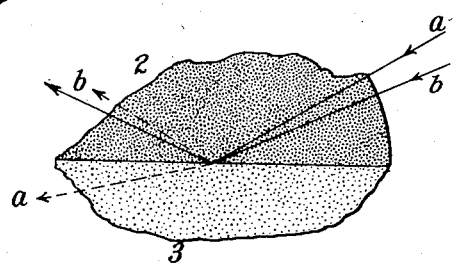
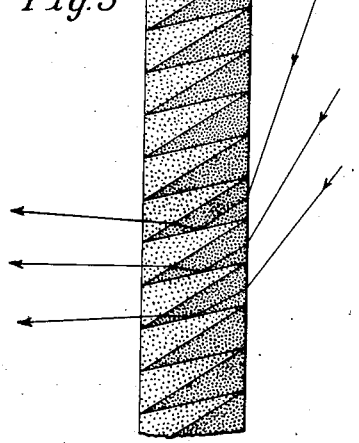
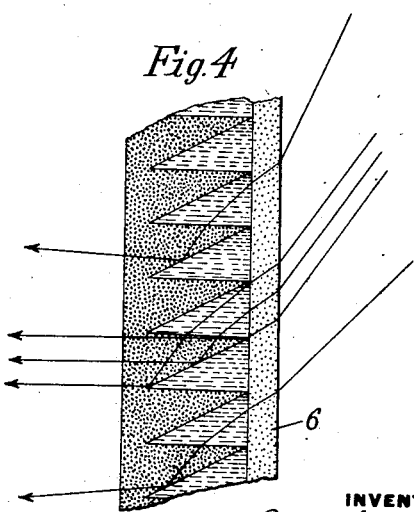
WITNESSES
Thomas W. Bakewell
George H. Sonneborn
INVENTOR
Frank L. O. Wadsworth No. 865,136. PATENTED SEPT. 3, 1907.
F. L. O. WADSWORTH.
METHOD OF MAKING PRISM GLASS.
APPLICATION FILED DEC. 12, 1905.

2 SHEETS—SHEET 2.

WITNESSES
Thomas W. Bakewell
George H. Sonneborn

INVENTOR
Frank L. O. Wadsworth

UNITED STATES PATENT OFFICE.

FRANK L. O. WADSWORTH, OF PITTSBURG, PENNSYLVANIA, ASSIGNOR TO PRESSED PRISM PLATE GLASS COMPANY, OF MORGANTOWN, WEST VIRGINIA, A CORPORATION OF WEST VIRGINIA.

METHOD OF MAKING PRISM-GLASS.

No. 865,136.     Specification of Letters Patent.     Patented Sept. 3, 1907.

Application filed December 12, 1905. Serial No. 291,397.

*To all whom it may concern:*

Be it known that I, FRANK L. O. WADSWORTH, of Pittsburg, in the county of Allegheny and State of Pennsylvania, have invented a new and useful Method of Making Prism-Glass, of which the following is a specification, reference being had to the accompanying drawings, in which—

Figure 1 is a vertical section of a piece of prism glass embodying my invention; Fig. 2 illustrates in diagram the mode of operation of the glass; and Figs. 3, 4, 5 and 6 are respectively sectional views showing modifications.

My invention provides a method by which sheets of prism-glass in which the angular prism surfaces are not exposed on the exterior of the sheet, can be made with success.

The advantages derived from the invention are very great. As the angular prism surface is not exposed, the glass can easily be cleaned, and it presents a much more sightly appearance than the prism-glass sheets heretofore known.

The invention is based upon the principle, illustrated in Fig. 2, that if two bodies of glass of unequal density be fused together in intimate surface contact the light rays will be refracted in passing from one body to the other, or reflected by the surface of one of the bodies at the plane of union according to the angle at which the rays impinge thereon. This is illustrated in Fig. 2, in which 2 and 3 represent bodies of glass of unequal densities welded or fused together. Rays of light *a* after passing through the body 2 are refracted in passing through the body 3, and rays *b* striking the plane of meeting of the two bodies at a less angle are reflected therefrom.

In the manufacture of prism glass in accordance with my invention I form a sheet of glass with a prismatic surface impressed thereon, employing preferably for that purpose the combined method of rolling and pressing described in Patent No. 661,025, granted to me conjointly with Daniel C. Ripley, and while the sheet so made is hot I roll upon it into a sheet a second body of glass of different density which will fill up the cavities between the prismatic projections and will intimately unite therewith. Thus, referring to Fig. 1, I first roll a mass of glass into a sheet 4, and while the glass is still plastic I bring down upon its surface a die having a prism pattern and impress the prism pattern upon the glass. Then, withdrawing the die, I cast upon the prism surface of the sheet a second body of glass of different density, and by means of a roller I spread it over the surface, filling the ridges between the prisms and forming it into a second sheet 5. The compound sheet may then be ground and polished. The manner in which the light rays are refracted and reflected by such sheet is illustrated in the lines in Fig. 1. For the denser body of glass I may use a barium-lead-soda glass, and for the less dense body a potash-lime glass. The proper composition of batch for such glass will be understood by those skilled in the art.

In Fig. 3 I show a compound sheet which has been made in the manner explained above, and ground on each side to the plane of the apexes of the prisms.

In Fig. 4 I show a compound sheet of prism glass consisting, as before, of two sheets of different density with the prism surfaces in intimate optical contact, but in which the sheet of less density is composed of other material than glass, such as Canada balsam, glycerin, etc. In this case a second flat sheet of glass 6 may be added to protect the outer surface of the less dense sheet. This outer sheet of glass, however, has no effect on the action of the compound prism sheet.

In Fig. 5 I show a compound sheet made as described with reference to Fig. 1, but with prisms of different form, and with the denser sheet of glass on the light-receiving side. The sheet of Fig. 1 has the less dense sheet on the light-receiving side.

The new article of manufacture herein described forms the subject-matter of a divisional application.

Figure 6:
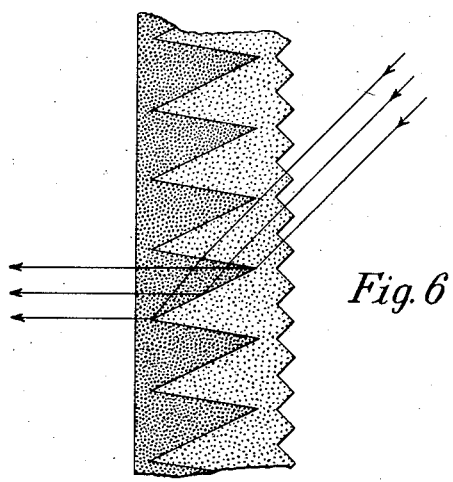

The sheet shown in Fig. 6 has the second-formed sheet 5 spread with a grooved roller which imparts a grooved or figured surface to the sheet.

Many other modifications in the method and article may be made by those skilled in the art, since

I claim:—

1. The method of making prism glass which consists in forming a transparent sheet with a prism surface and then forming a second sheet of transparent material of different density thereon, filling the cavities of the prism surface.

2. The method of making prism glass which consists in rolling a glass sheet, pressing a prism pattern on its surface, and then forming a second sheet of transparent material of different density thereon, filling the cavities of the prism surface.

3. The method of making compound multi-layer glass sheets which consists in forming a glass sheet with a figured surface, and then forming a second sheet of glass thereon, filling the cavities of the figured surface.

4. The method of making prism glass which consists in forming a glass sheet with a prism surface and while it is hot forming a second sheet of glass of different density thereon, filling the cavities of the prism surface.

5. The method of making prism glass which consists in rolling a glass sheet, pressing a prism pattern on its surface, and while it is hot forming a second sheet of glass of different density thereon, filling the cavities of the prism surface.

6. The method of making compound multi-layer glass sheets which consists in forming a glass sheet with a figured surface, and while it is hot forming a second sheet of glass thereon, filling the cavities of the figured surface.

In testimony whereof, I have hereunto set my hand.

FRANK L. O. WADSWORTH.

Witnesses:
GEORGE H. SONNEBORN,
FREDERICK H. DAVIS.